United States Patent
Wang et al.

(10) Patent No.: US 12,158,177 B2
(45) Date of Patent: Dec. 3, 2024

(54) SLIDING POSITIONING STRUCTURE

(71) Applicant: FIVETECH TECHNOLOGY INC., New Taipei (TW)

(72) Inventors: Ting-Jui Wang, New Taipei (TW); Hsien-Chang Chen, New Taipei (TW)

(73) Assignee: FIVETECH TECHNOLOGY INC., New Taipei (TW)

( * ) Notice: Subject to any disclaimer, the term of this patent is extended or adjusted under 35 U.S.C. 154(b) by 809 days.

(21) Appl. No.: 16/721,938

(22) Filed: Dec. 20, 2019

(65) Prior Publication Data

US 2020/0200216 A1 Jun. 25, 2020

(30) Foreign Application Priority Data

Dec. 22, 2018 (TW) ................................ 107146688

(51) Int. Cl.
*F16B 5/06* (2006.01)
*F16B 21/09* (2006.01)

(52) U.S. Cl.
CPC ............ *F16B 5/0621* (2013.01); *F16B 21/09* (2013.01)

(58) Field of Classification Search
CPC ...... F16B 5/0621; F16B 5/0208; F16B 21/09; F16C 29/001
See application file for complete search history.

(56) References Cited

U.S. PATENT DOCUMENTS

| | | | | |
|---|---|---|---|---|
| 2,352,392 | A * | 6/1944 | Kost | F16B 21/09 411/529 |
| 3,392,427 | A * | 7/1968 | Joseph | F16B 21/09 24/628 |
| 4,766,652 | A * | 8/1988 | Sugiura | F16B 5/0657 24/297 |
| 5,507,610 | A * | 4/1996 | Benedetti | F16B 5/0628 411/908 |
| 6,540,251 | B1 * | 4/2003 | LeVey | B60R 21/213 280/728.2 |
| 6,595,379 | B1 * | 7/2003 | Powell | F16B 21/09 403/321 |
| 6,981,886 | B1 * | 1/2006 | Co | H01R 13/62988 439/152 |
| 7,904,994 | B2 * | 3/2011 | Girodo | F16B 21/09 24/453 |
| 8,585,121 | B2 * | 11/2013 | Marx | F16B 21/02 24/297 |

(Continued)

FOREIGN PATENT DOCUMENTS

CN 107120342 A 9/2017
CN 108075328 A 5/2018

(Continued)

*Primary Examiner* — Matthew R McMahon

(57) ABSTRACT

A sliding positioning structure includes a seat, a first fastening body and a second fastening body. The first fastening body is movably assembled at the seat. The second fastening body is provided at the seat, and is for longitudinally fastening, latitudinally fastening or rotationally fastening to a first object. Accordingly, the seat can be quickly assembled with the first object by using the second fastening body, and be coupled with or removed from a second object by using the first fastening body, thereby accomplishing coupling or disengagement of two objects and achieving effects of repeated and quickly coupling and disengagement.

7 Claims, 15 Drawing Sheets

(56) References Cited

U.S. PATENT DOCUMENTS

| | | | | |
|---|---|---|---|---|
| 9,562,549 | B2* | 2/2017 | McClure | F16B 21/09 |
| 10,294,971 | B2* | 5/2019 | Wu | F16B 5/0635 |
| 10,408,434 | B2* | 9/2019 | Pan | F16B 21/02 |
| 10,914,337 | B2* | 2/2021 | Dobbs | F16B 21/09 |
| 11,047,407 | B2* | 6/2021 | Wang | H05K 7/1409 |
| 2012/0097815 | A1* | 4/2012 | Morita | F16B 21/09 |
| | | | | 248/224.8 |
| 2014/0317889 | A1* | 10/2014 | Hida | F16B 21/076 |
| | | | | 24/293 |
| 2017/0211786 | A1* | 7/2017 | Pan | F16B 21/02 |
| 2020/0281086 | A1* | 9/2020 | Wang | G11B 33/124 |

FOREIGN PATENT DOCUMENTS

| | | | |
|---|---|---|---|
| CN | 207328078 U | 5/2018 | |
| FR | 2911647 A1 | 7/2008 | |
| JP | 2008258363 A | 10/2008 | |
| TW | M523782 U | 6/2016 | |
| TW | 542798 U * | 6/2017 | H01R 13/73 |
| TW | M542798 U | 6/2017 | |
| TW | M550344 U | 10/2017 | |
| TW | M552955 U | 12/2017 | |

\* cited by examiner

SLIDING POSITIONING STRUCTURE

CROSS-REFERENCE TO RELATED APPLICATION

This non-provisional application claims priority under 35 U.S.C. § 119(a) on Patent Application No(s). 107146688 filed in Taiwan, R.O.C. on Dec. 22, 2018, the entire contents of which are hereby incorporated by reference.

BACKGROUND OF THE INVENTION

1. Field of the Invention

The present invention relates to a sliding positioning structure, and more particularly to a sliding positioning structure for repeatedly and quickly coupling with or disengaging from at least one object.

2. Description of the Related Art

In general, to couple with at least one object, a screw is usually used for fastening and locking the object.

However, in the conventional fixing means above, although the at least one object can be fixed by a coupling mode such that the object is not easily disengaged, in addition to resulting in a situation where assembly can be challenging, it can also be difficult to remove the at least one object due to the fixed coupling mode of the screw.

Therefore, the disclosure of the present invention aims to provide a sliding positioning structure so as to achieve an object of repeatedly and quickly coupling with and disengaging from at least one object.

BRIEF SUMMARY OF THE INVENTION

In view of the drawbacks and room for improvement of the above-mentioned prior art, the Inventor is dedicated to research to further develop a sliding positioning structure, so as to achieve the object of repeatedly and quickly coupling with and disengaging from at least one object.

To achieve the above and other objects, the present invention provides a sliding positioning structure including a seat, a first fastening body and a second fastening body. The first fastening body is movably assembled at the seat. The second fastening body is provided at the seat.

In the sliding position structure above, the seat is laterally provided with a sliding portion, the first fastening body is laterally provided with a corresponding sliding portion, and the corresponding sliding portion is movably coupled with the sliding portion, so as to latitudinally and movably assemble the first fastening body at the seat.

In the sliding position structure above, the sliding portion is a channel or a guiding rail, and the corresponding sliding portion is a guiding rail or a channel.

One end of the seat is provided with an abutting portion, one end of the first fastening body is provided with a limiting portion, and the limiting portion corresponds to the abutting portion.

In the sliding position structure above, one end of the seat is provided with a guiding portion, one end of the first fastening portion is provided with a corresponding guiding portion, and the corresponding guiding portion is movably coupled with the guiding portion.

In the sliding position structure above, the guiding portion is a groove or a sliding block, and the corresponding guiding portion is a sliding block or a groove.

In the sliding position structure above, the seat is provided with an assembling portion, one surface of the first fastening body is provided with a corresponding assembling portion, the corresponding assembling portion corresponds to the assembling portion, and the second fastening body passes through the corresponding assembling portion and the assembling portion.

In the sliding position structure above, the assembling portion is a hole, and the corresponding assembling portion is a long hole.

In the sliding positioning structure above, a first elastic element is provided between the seat and the first fastening body, and two ends of the first elastic element are respectively abutted against the seat and the first fastening body.

In the sliding positioning structure above, the second fastening body includes a body portion and a fastening portion, the body portion is longitudinally and movably assembled at the seat and the first fastening body, and the fastening portion is provided on one end of the body portion and is located at the bottom of the seat.

In the sliding position structure above, a second elastic element passes through the body portion, and two ends of the second elastic element are respectively abutted against the seat and the second fastening body.

In the sliding positioning structure above, the second fastening body is longitudinally and movably or latitudinally and movably assembled at the seat or the first fastening body.

In the sliding positioning structure above, the second fastening body is provided at the bottom of the seat.

In the sliding positioning structure above, the second fastening body includes a coupling base, and the coupling base includes an elastic piece.

In the sliding positioning structure above, the coupling base includes a guiding groove.

In the sliding positioning structure above, the seat laterally includes an extension portion, and a protrusion is provided at the bottom surface of the extension portion.

In the sliding positioning structure above, one end of the first fastening body is provided with a limiting portion, and the other end of the first fastening body is provided with a restricting portion jointly forming blocking with the seat.

In the sliding positioning structure above, the elastic piece is for latitudinally fitting with a first object, and for elastically abutting against the first object.

In the sliding positioning structure above, the protrusion is for fitting with an end surface of a first object when the seat is latitudinally fitted with the first object, and for enabling the seat to perform latitudinal limiting.

In the sliding positioning structure above, the coupling base is for fitting with a first object, the first object includes a pass area, and the coupling base is for entering the pass area and then fitting with the first object by using the elastic piece.

In the sliding positioning structure above, the coupling base is for fitting with a first object, the first object includes a pass area and a restricting area, and the coupling base is for entering the pass area, then entering the restricting area by using the guiding groove, and fitting with the first object by using the elastic piece.

In the sliding positioning structure above, the second fastening body includes a fastening portion, the fastening portion is for fitting with a first object, the first object includes a pass area, and the fastening portion is for entering the pass area and then fitting with the first object.

In the sliding positioning structure above, the second fastening body includes a fastening portion, the fastening portion is for fitting with a first object, the first object includes a pass area and a restricting area, and the fastening portion is for entering the pass area and then entering the restricting area, and the second fastening body is fitted with the first object by using the fastening portion.

In the sliding positioning structure above, the second fastening body is provided at the bottom of the seat, the seat includes at least one elastic stopping portion, the second fastening body is for assembling to a first object, and the elastic stopping portion is for elastically stopping the first object, enabling the first object to be elastically fastened between the second fastening body and the elastic stopping portion.

In the sliding positioning structure above, the second fastening body and the elastic stopping portion are in the same or different stopping directions, so as to vertically fasten at the first object, or to first vertically pass the second fastening body through the first object and then rotate the second fastening body, and to rotationally fasten the first object.

In the sliding positioning structure above, the first object includes an assembled portion, the second fastening body is for passing through the assembled portion of the first fastening body and then rotating by 5 degrees to 355 degrees, so as to interfere with, fasten with or abut against the first object.

In the sliding positioning structure above, the first fastening body is limited by a limiting portion and is provided at the seat by means of rotation, an elastic element is further included, and two ends of the elastic elements are respectively abutted against the seat and the first fastening body.

In the sliding positioning structure above, the bottom of the seat includes a positioning portion for positioning at a first object, such that the seat is simultaneously positioned by the positioning portion when assembled at the first object by the second fastening body, and the seat is provided with two latitudinal limiting structures including the second fastening body and the positioning portion such that the seat is not rotated or turned.

In the sliding positioning structure above, two ends of the first fastening body are respectively provided with an operating portion and a fastening portion.

In the sliding positioning structure above, the second fastening body includes an axial portion and an obstructing portion, and the width of the axial portion is smaller than a longer side of the obstructing portion and is smaller than an assembled portion of a first object.

In the sliding positioning structure above, the assembled portion of the first object is a wide hole, the longer side of the obstructing portion passes through the first object from the longer side of the wide hole and is rotated, so as to rotate the longer side of the obstructing portion to a position of a non-longer side of the wide hole to perform obstruction.

In the sliding positioning structure above, the seat includes at least one elastic stopping portion, a bottom surface of the elastic stopping portion is provided with a fastening protrusion, and the fastening protrusion is for rotating from a non-longer side or a longer side of the wide hole to a longer side or a non-longer side of the wide hole to stop inside or outside the wide hole so as to limit the positioning of the obstructing portion.

In the sliding positioning structure above, the assembled portion of the first object is a wide hole, the seat includes at least one elastic stopping portion, and the elastic stopping portion is for rotating from a non-longer side or a longer side of the wide hole to a longer side or a non-longer side of the wide hole to stop against a surface of the first object.

In the sliding positioning structure above, the first fastening body includes a guiding portion, and the guiding portion is for receiving a force and drawing back when a second object applies a pressure on the guiding portion, and for enabling the second object to enter between the first fastening body and the seat, so as to limit the second object between the first fastening body and the seat.

In the sliding positioning structure above, the sliding positioning structure is first assembled to a first object and then latitudinally fastens or interferes with a second object, and the first object or the second object is a printed circuit board (PCB), a metal plate or a plastic plate.

In the sliding positioning structure above, the sliding positioning structure includes a conduction circuit part, which is mutually connected with a conduction circuit portion of the first object or the second object and is for guiding static electricity or electric current.

In the sliding positioning structure above, the second fastening body is a fastening structure provided in a first direction of the seat, and is for coupling with a fastening hole of a first object, and the second fastening body is greater than the fastening hole.

In the sliding positioning structure above, the second fastening body is a fastening structure provided in a first direction of the seat, and is for coupling with a fastening hole of a first object, the second fastening body is greater than the fastening hole, and the second fastening body contracts after entering the fastening hole and expands after passing through the fastening hole.

In the sliding positioning structure above, the first fastening body is an anti-slip structure appearing projecting, recessed or stepped in shape; alternatively, the first fastening body includes an operating portion, wherein the operating portion can be an anti-slip structure appearing projecting, recessed or stepped in shape, or the operating structure can be a wing-like structure, a hooked structure, a column-like structure, an arc structure, a sloped structure, a stepped structure or a planar structure.

Accordingly, the sliding positioning structure of the present invention enables a seat to be quickly assembled with a first object by using a second fastening body, and to be coupled with or removed from a second object by using a first fastening body, so as to complete coupling or disengagement of two objects, achieving the object of repeated and quick coupling and disengagement.

DETAILED DESCRIPTION OF THE INVENTION

To fully understand the object, features and effects of the present invention, details of the present invention are given in the specific embodiments with the accompanying drawings below.

Referring to FIG. 1 to FIG. 7, as shown, the present invention provides a sliding positioning structure 1, including a seat 11, a first fastening body 12 and a second fastening body 13.

The first body 12 is latitudinally and movably assembled at the seat 11.

The second fastening body 13 is longitudinally and movably assembled at the seat 11 and the first fastening body 12.

Figure 3:
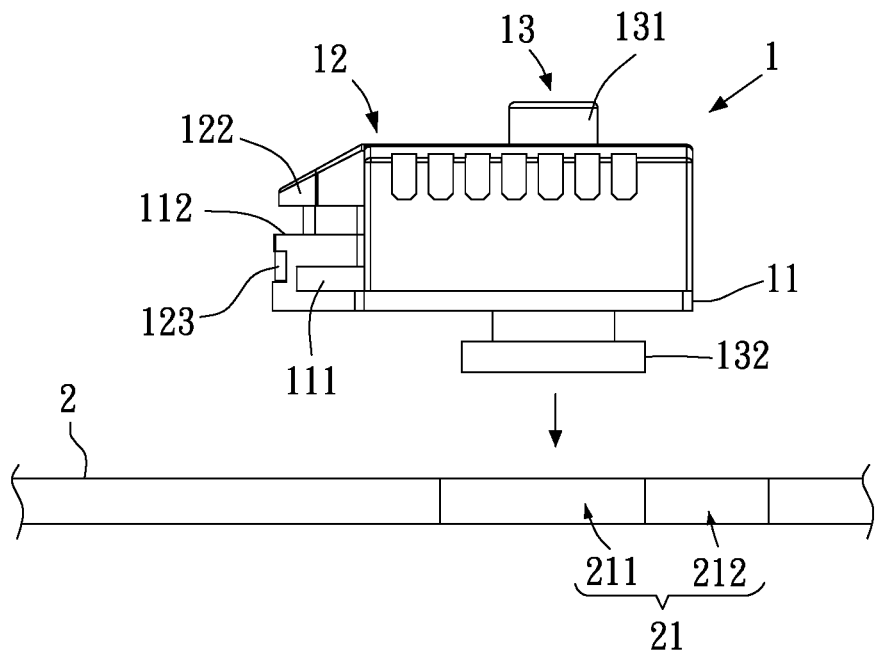
FIG. 3 is a first schematic diagram of a state of use of a second fastening body according to the first preferred embodiment of the present invention.
Figure 4:
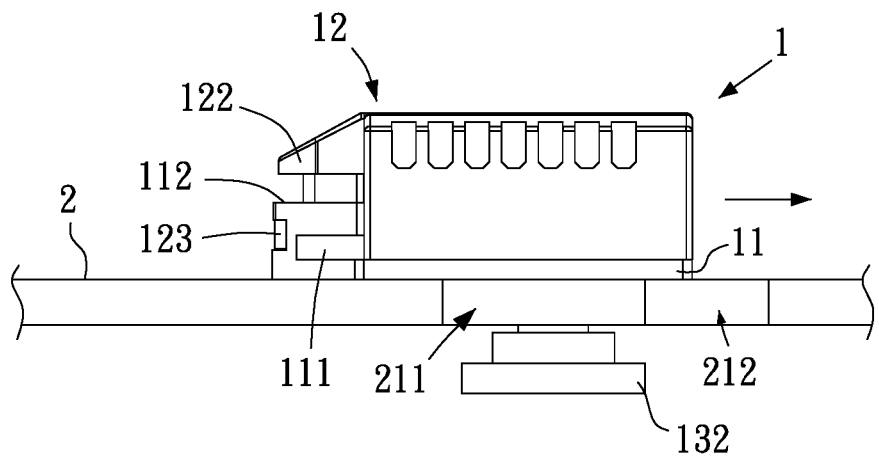
FIG. 4 is a second schematic diagram of a state of use of a second fastening body according to the first preferred embodiment of the present invention.
Figure 5:
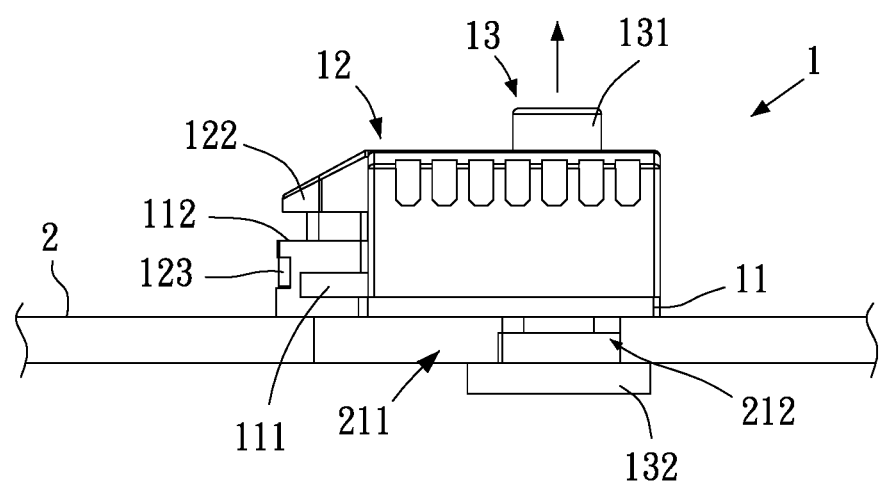
FIG. 5 is a third schematic diagram of a state of use of a second fastening body according to the first preferred embodiment of the present invention.
Figure 6:
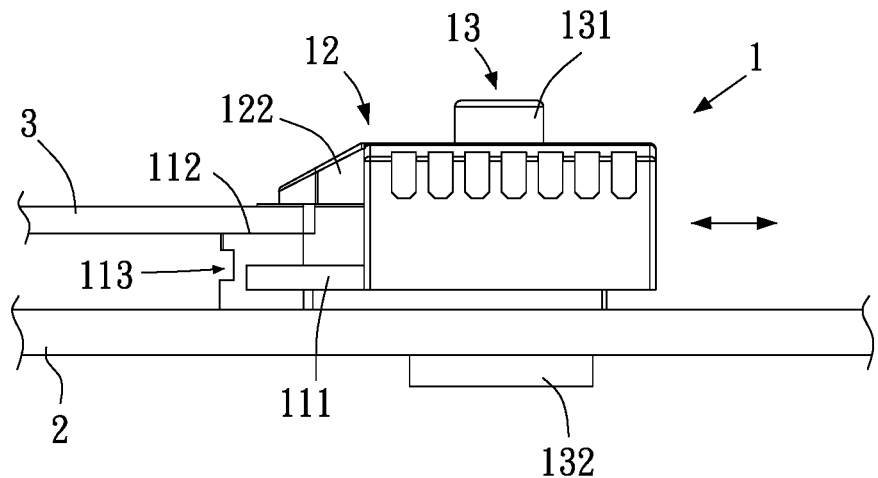
FIG. 6 is a first schematic diagram of a state of use of a first fastening body according to the first preferred embodiment of the present invention.
Figure 7:
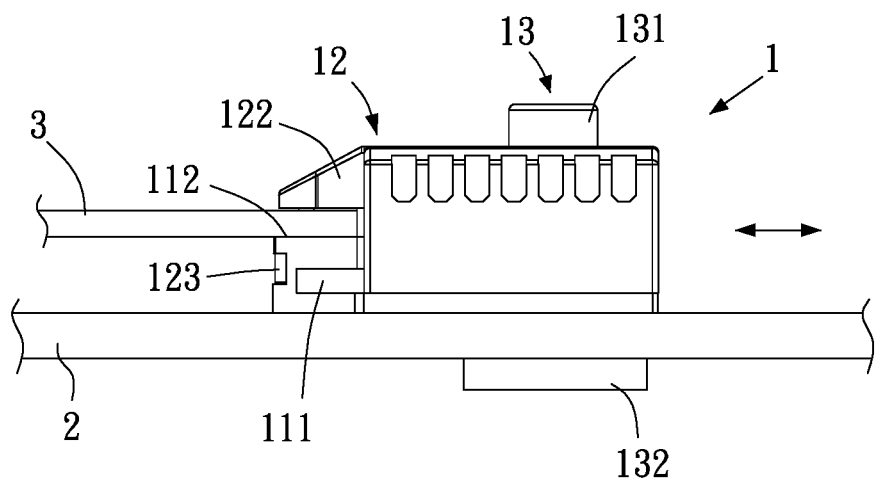
FIG. 7 is a second schematic diagram of a state of use of a first fastening body according to the first preferred embodiment of the present invention.
Figure 8:
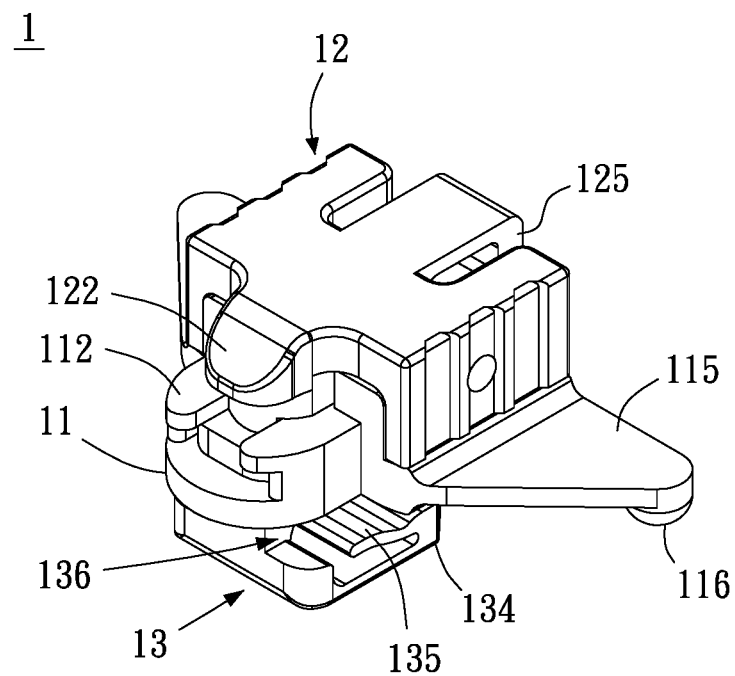
FIG. 8 is a perspective appearance schematic diagram according to a second preferred embodiment of the present invention.
Figure 9:
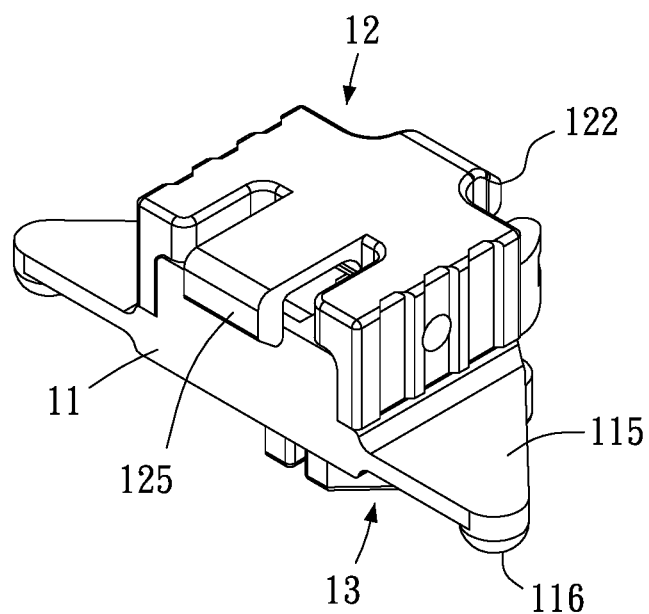
FIG. 9 is another perspective appearance schematic diagram according to a second preferred embodiment of the present invention.

To put to use, the sliding positioning structure 1 can be assembled on a first object 2. For assembly, the seat 11 is placed on the first object 2, and the second fastening body 13 is longitudinally moved and fastened to an assembling hole 21 of the first object 2, thus completing the assembly of the seat 11 and the first object 2 (as shown in FIG. 3 to FIG. 5). Then, the first fastening body 12 can be moved toward one side, a second object 3 is placed on the seat 11, and the first fastening body 12 is latitudinally moved toward the direction of the second object 3, such that the latitudinally moved first fastening body 12 is fastened at the second object 3. To disengage the second object 3, the first fastening body 12 is again moved latitudinally, such that the first fastening body 12 moves away the second object 3 and the second object 3 is then disengaged from the seat 11 (as shown in FIG. 6 and FIG. 7). Thus, the seat 11 is enabled to be assembled with the first object 2 by using the second fastening body 13, and be coupled with or moved away from the second object 3 by using the first fastening body 12, so as to complete coupling and disengagement of two objects, achieving the effect of repeated and quick coupling and disengagement.

Figure 1:
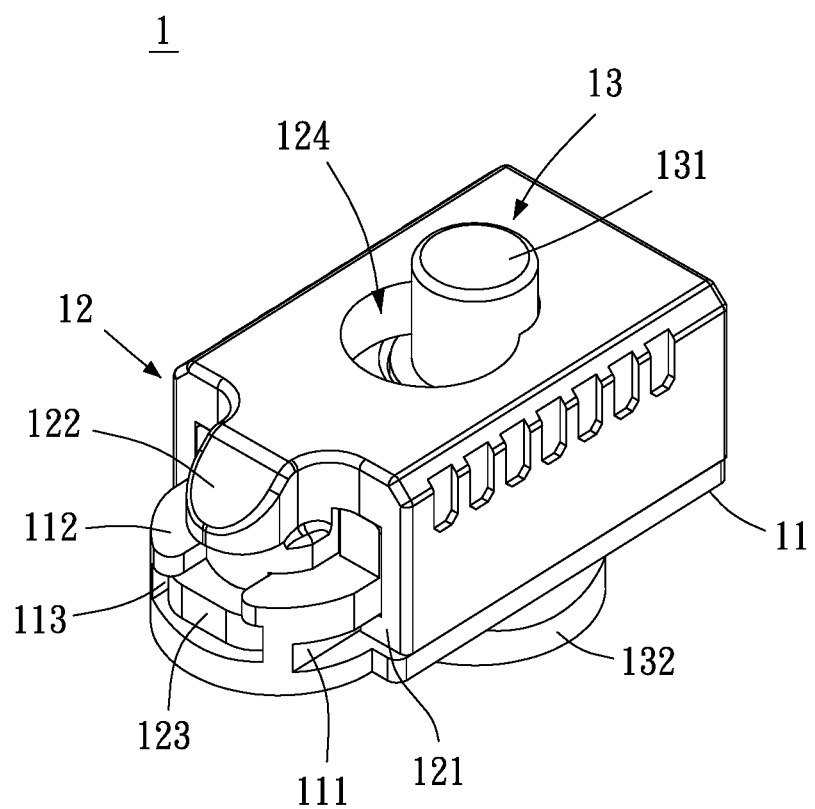
FIG. 1 is a perspective appearance schematic diagram according to a first preferred embodiment of the present invention.
Figure 2:
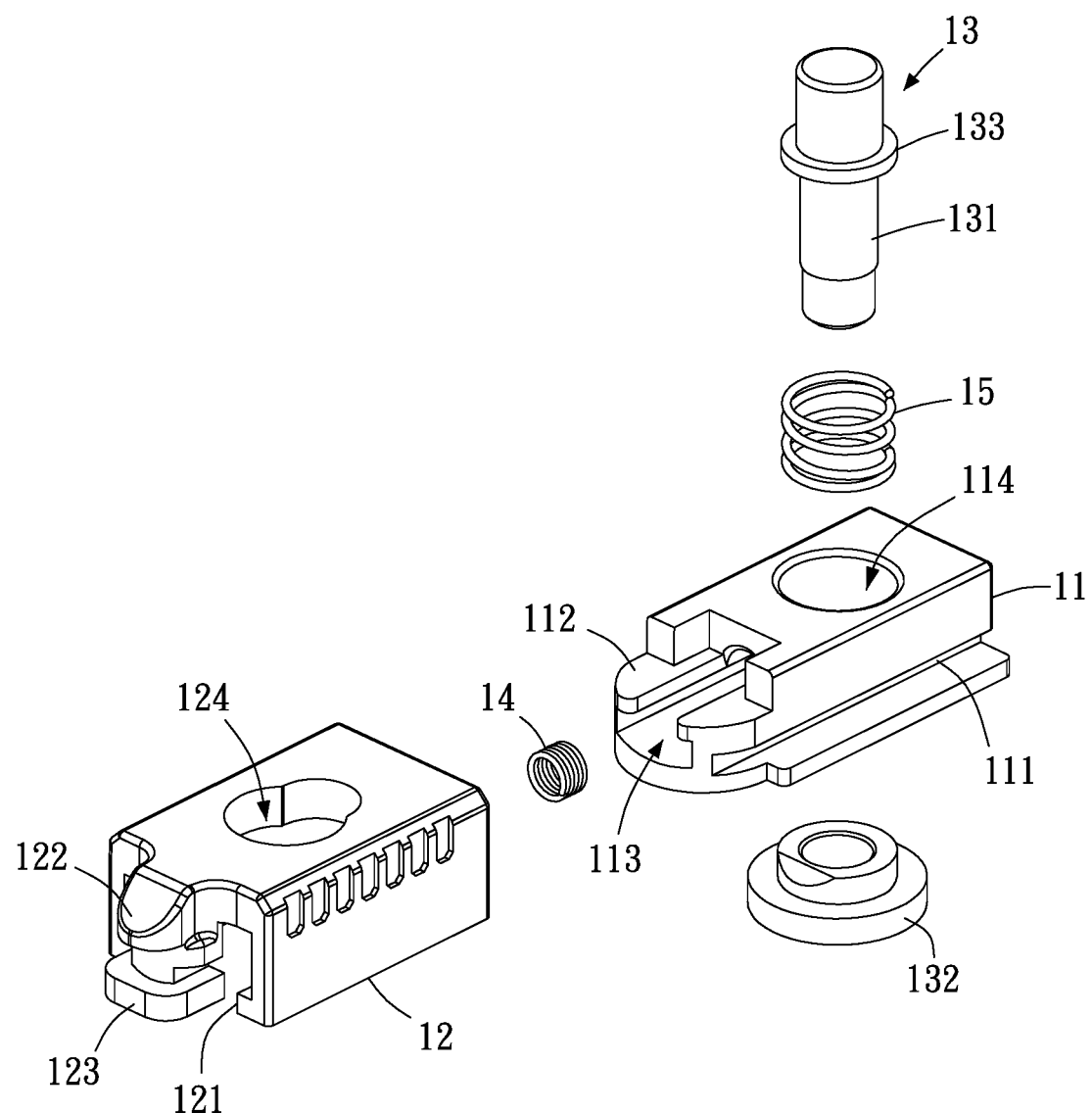
FIG. 2 is an exploded appearance schematic diagram according to the first preferred embodiment of the present invention.

In a preferred embodiment of the present invention (as shown in FIG. 1 and FIG. 2), a sliding portion 111 is provided on each of two sides of the seat 11, a corresponding sliding portion 121 is provided on each of two sides of the first fastening body 12, and the corresponding sliding portions 121 are respectively movably coupled with the sliding portions 111. The sliding portion 111 can be a channel or a guiding rail, and the corresponding sliding portion 121 can be a guiding rail or a channel. In this embodiment, the sliding portion 111 is a channel, and the corresponding sliding portion 121 can be a guiding rail.

Accordingly, when the first fastening body 12 moves latitudinally on the seat 11, an effect of smooth movement can be achieved by using matching between the corresponding sliding portion 121 and the sliding portion 111.

In a preferred embodiment of the present invention (as shown in FIG. 1 and FIG. 2), one end of the seat 11 is provided with an abutting portion 112, one end of the first fastening body 12 is provided with a limiting portion 122, and the limiting portion 122 corresponds to the abutting portion 112. Further, one end of the seat 11 is provided with a guiding portion 113, one end of the first fastening body 12 is provided with a corresponding guiding portion 123, and the corresponding guiding portion 123 is movably coupled with the guiding portion 113. The guiding portion 113 can be a groove or a sliding block, and the corresponding guiding portion 123 can be a sliding block or a groove. In this embodiment, the guiding portion 113 is a groove, and the corresponding guiding portion 123 is a sliding block. Further, the abutting portion 112 is located on two sides of the top of the guiding portion 113, and the corresponding guiding portion 123 is provided below the limiting portion 122.

Accordingly, when the first fastening body 12 moves latitudinally on the seat 11, in addition to using matching between the corresponding sliding portion 121 and the sliding portion 111, the effect of smooth movement can be achieved by using matching between the corresponding guiding portion 123 and the guiding portion 113.

Moreover, when the second object 3 is coupled (as shown in FIG. 6 and FIG. 7), the first fastening body 12 can be first latitudinally moved toward one side, the second object 3 is then placed on the abutting portion 112 of the seat 11, and the first fastening body 12 is latitudinally moved toward the direction of the second object 3, such that the limiting portion 122 of the latitudinally moved first fastening body 12 is fastened at the second object 3. When the second object 3 is to be disengaged, the first fastening body 12 is moved latitudinally toward one side, such that the limiting portion 122 of the first fastening body 12 moves away the second object 3 and the second object 3 is disengaged from the abutting portion 112 of the seat 11. Thus, coupling and disengagement of two objects can be completed, thereby achieving the effect of repeated and quick coupling and disengagement.

In a preferred embodiment of the present invention (as shown in FIG. 1 to FIG. 5), the seat 11 is provided with an assembling portion 114, one surface of the first fastening body 12 is provided with a corresponding assembling portion 124, and the corresponding assembling portion 124 corresponds to the assembling portion 114. The second fastening body 13 passes through the corresponding assembling portion 124 and the assembling portion 114, wherein the assembling portion 114 can be a hole, and the corresponding assembling portion 124 can be long hole.

Accordingly, the seat 11 can be placed on the first object 2, and the second fastening body 13 is longitudinally moved in the corresponding assembling portion 124 and the assembling portion 114 and then fastened at the assembling hole 21 of the first object 2, so as to complete coupling of the seat 11 and the first object 2. Further, when the first fastening body 12 moves latitudinally, the first fastening body 12 can be moved on the outer side of the second fastening body 13 by using the corresponding assembling portion 124 without affecting or moving the second fastening body 13.

In a preferred embodiment of the present invention (as shown in FIG. 2, FIG. 6 and FIG. 7), a first elastic element 14 is provided between the seat 11 and the first fastening body 12, and two ends of the first elastic element 14 are respectively abutted against the seat 11 and the first fastening body 12.

Accordingly, when the second object 3 is to be coupled, a force can be applied to latitudinally move the first fastening body 12 toward one side, the first elastic element 14 is simultaneously compressed, the second object 3 is placed on the abutting portion 112 of the seat 11, and the first fastening body 12 is then released (i.e., no force is applied on the first fastening body 12), such that the first elastic element 14 is elastically released and thus pushes the first fastening body 12 to latitudinally move toward the direction of the second object 3, such that the limiting portion 122 of the latitudinally moved first fastening body 12 is fastened at the second object 3. When the second object 3 is to be disengaged, the first fastening body 12 is moved latitudinally toward one side, the first elastic element 14 is simultaneously compressed to enable the limiting portion 122 of the first fastening body 12 to move away the second object 3 and to disengage the second object 3 from the abutting portion 112 of the seat 11, and the first fastening body 12 is released to elastically release the first elastic element 14 to push and restore the first fastening body 12 for use of a next round. Thus, coupling and disengagement of two objects can be completed, achieving the effect of repeated and quick coupling and disengagement.

In a preferred embodiment of the present invention (as shown in FIG. 2 to FIG. 5), the second fastening body 13 includes a body portion 131 and a fastening portion 132, the body portion 131 is longitudinally and movably assembled at the assembling portion 114 of the seat 11 and the corresponding assembling portion 124 of the first fastening body 12, and the fastening portion 132 is provided on one end of the body portion 131 and is located at the bottom of the seat 11. A blocking portion 133 is provided at a position near the other end of the body portion 131. A second elastic element 15 passes through the body portion 131, and two ends of the second elastic element 15 are respectively abutted against the seat 11 and the blocking portion 133 of the second fastening body 13. Further, the assembling hole 21 of the first object 2 includes a pass area 211 and a restricting area 212 in communication with each other, and the fastening portion 132 is smaller than the pass area 211 and greater than the restricting area 212.

Accordingly, the seat 11 an be placed on the first object 2, the second fastening body 13 is corresponded to the assembling hole 21, and a downward external force is applied on the body portion 131, such that the fastening portion 132 passes through the pass area 211 after the body portion 131 longitudinally moves in the corresponding assembling portion 124 and the assembling portion 114. At the same time, the second elastic element 15 is compressed, the seat 11 is latitudinally moved to allow the body portion 131 to enter the restricting area 212, and the body portion 131 is then released (i.e., no force is applied on the body portion 131). At this point, the second elastic element 15 is elastically released to push the body portion 131 upward and to drive the fastening portion 132 to move toward the bottom surface of the first object 2. Because the fastening portion 132 is greater than the restricting portion 212 and with the second elastic element 15 pushing upward, the fastening portion 132 can abut against (be fitted with) the bottom surface of the first object 2, further fastening the second fastening body 13 at the assembling hole 21 of the first object 2 so as to complete the assembly of the seat 11 and the first body 2, thereby achieving an effect of quick assembly.

Referring to FIG. 8 to FIG. 14, as shown, in this embodiment, the second fastening body 13 is provided at the bottom of the seat 11. The second fastening body 13 includes a coupling base 134, the coupling base 134 includes therein an elastic piece 135, a guiding groove 136 is provided on each of two sides of the coupling base 134. An extension portion 115 is provided on each two of sides of the seat 11, and a protrusion 116 is provided on a bottom surface of each of the extension portions 115. Further, one end of the first fastening body 12 is provided with a limiting portion 122, and the other end of the first fastening body 12 is provided with a restricting portion 125 jointly forming blocking with the seat 11.

Figure 10:
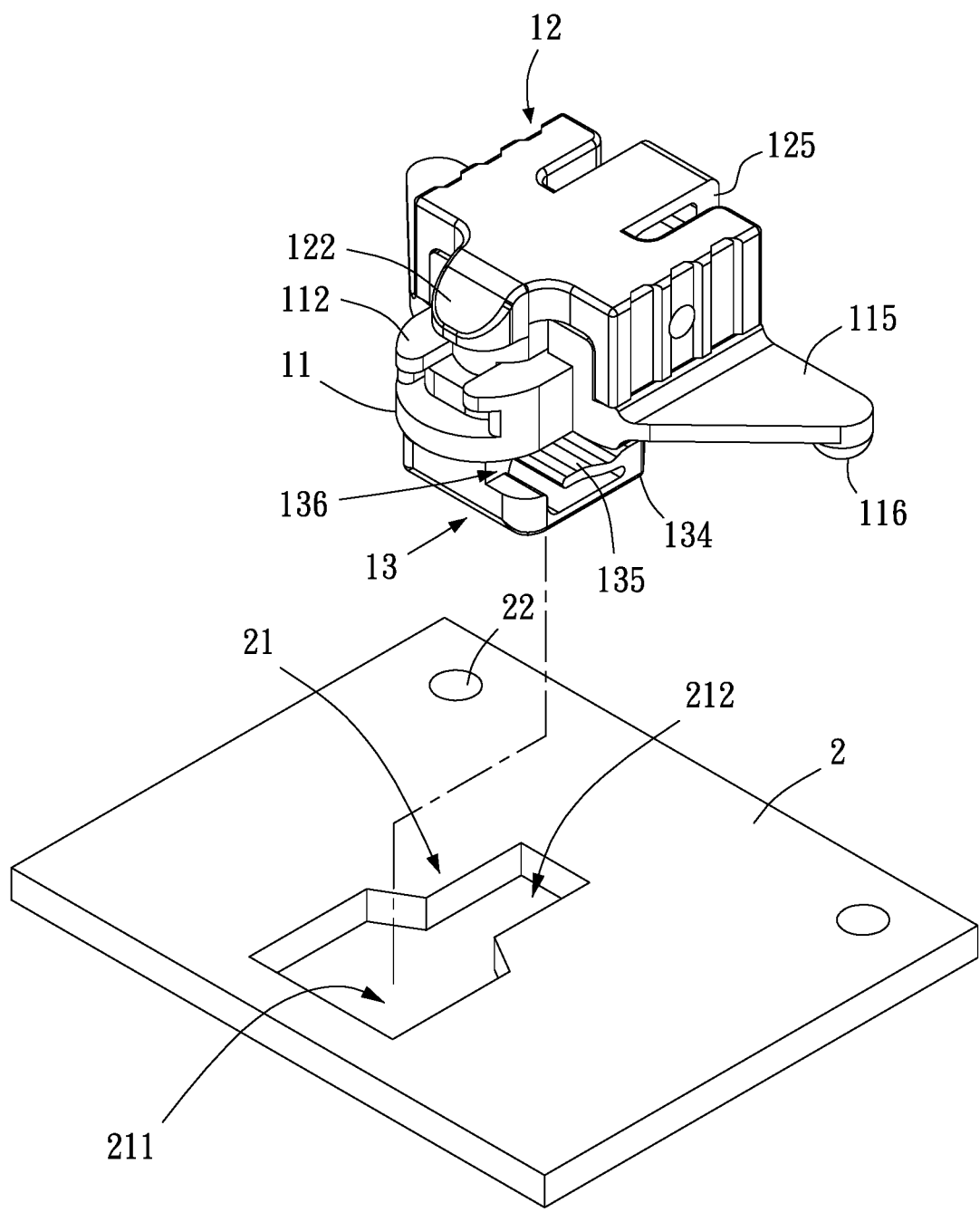
FIG. 10 is a first schematic diagram of a state of use of a second fastening body according to the second preferred embodiment of the present invention.
Figure 11:
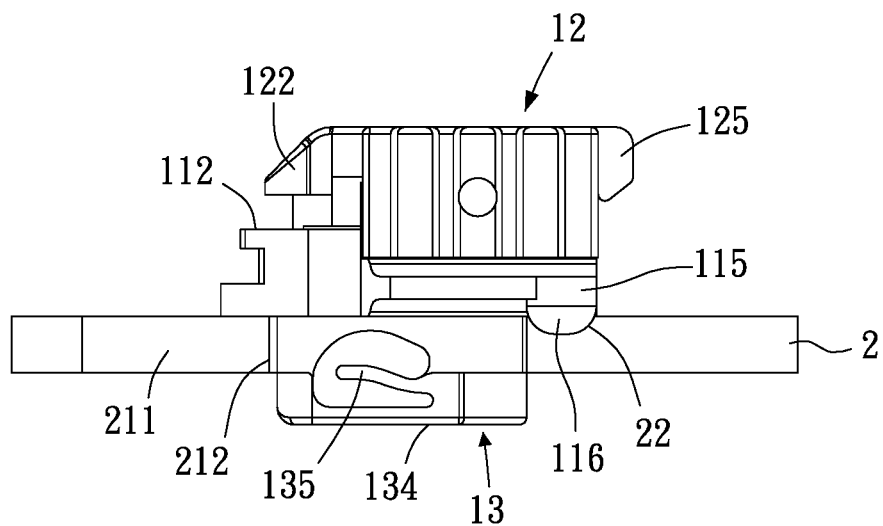
FIG. 11 is a second schematic diagram of a state of use of a second fastening body according to the second preferred embodiment of the present invention.
Figure 12:
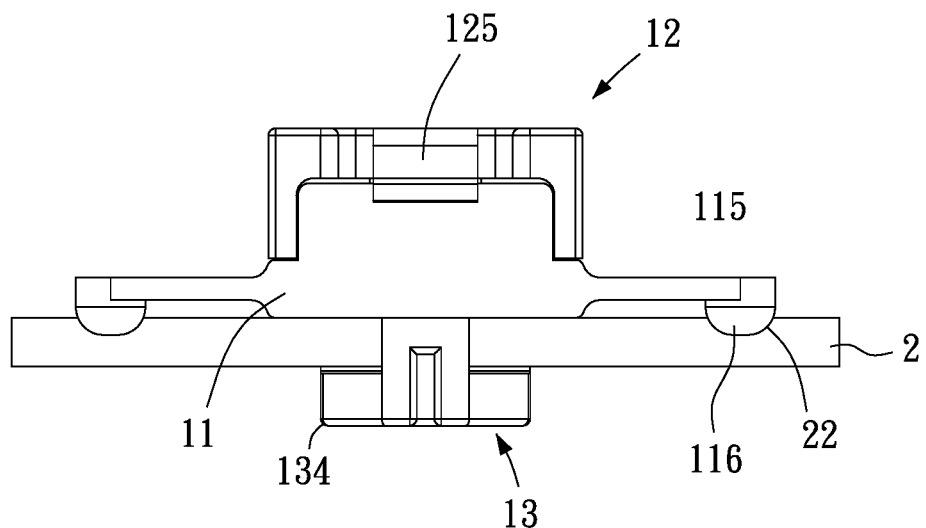
FIG. 12 is a third schematic diagram of a state of use of a second fastening body according to the second preferred embodiment of the present invention.

To put to use, the sliding positioning structure 1 can be assembled on a first object 2. For assembly, the coupling base 134 of the second fastening body 13 is correspondingly provided at the pass area 211 of the assembling hole 21 of the first object 2, and a latitudinal external force is applied to the seat 11, such that the guiding grooves 136 of the coupling base 134 enter the restricting area 212 of the assembling hole 21. Once the seat 11 is latitudinally fitted with the first object 2, the protrusions 116 at the bottom surfaces of the extension portions 115 at the same time are fitted with the assembling portion 22 at the end surface of the first object 2, and the elastic piece 135 is latitudinally fitted with the first object 2 and elastically abut against the bottom surface of the first object 2 (as shown in FIG. 10 to FIG. 12), so as to complete assembly of the seat 11 and the first object 2 and to latitudinally fasten the second fastening body 13 at the first object 2, thereby achieving the effect of quick assembly.

Figure 13:
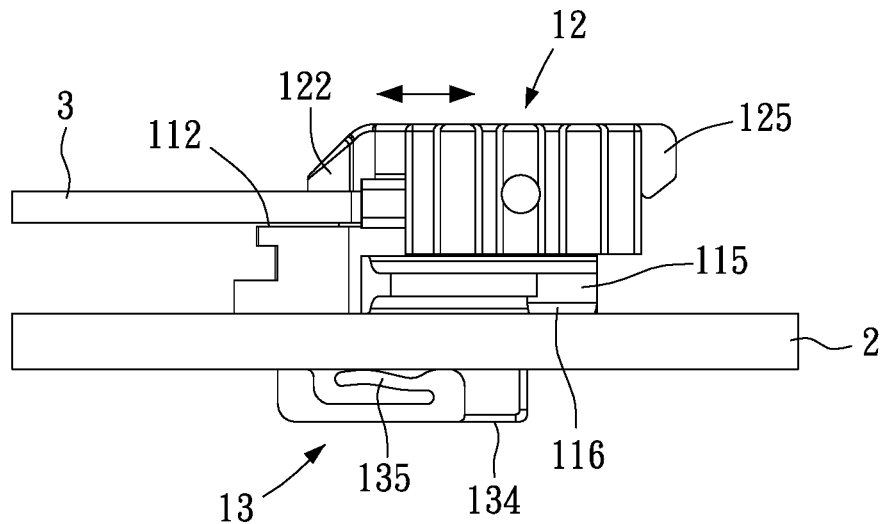
FIG. 13 is a first schematic diagram of a state of use of a first fastening body according to the second preferred embodiment of the present invention.
Figure 14:
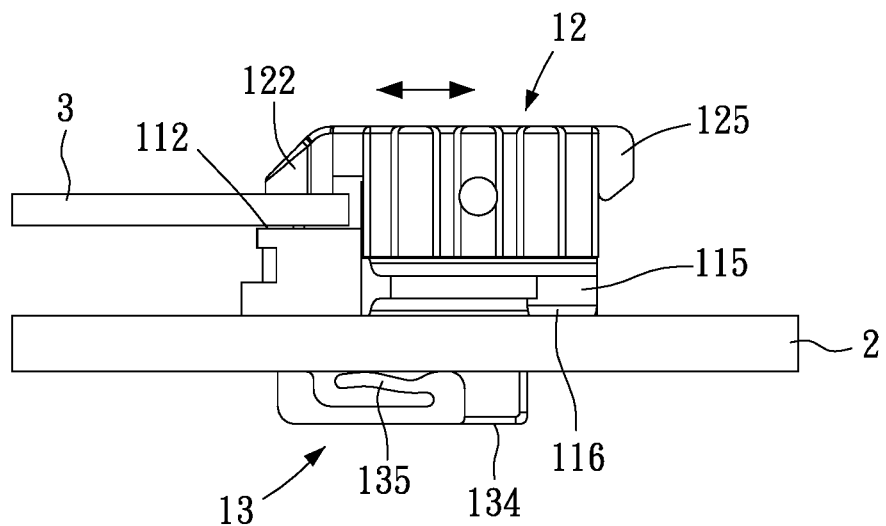
FIG. 14 is a second schematic diagram of a state of use of a first fastening body according to the second preferred embodiment of the present invention.

To assemble a second object 3, a force can be applied to latitudinally move the first fastening body 12 toward one side, the first elastic element (not shown) is simultaneously compressed, then the second body 3 is placed on the abutting portion 112 of the seat 11, and the first fastening body 12 is released (i.e., no force is applied on the first fastening body 12), such that the first elastic element is elastically released to push first fastening body 12 to latitudinally move toward the direction of the second object 3, such that the limiting portion 122 of the latitudinally moved first fastening body 12 is fastened at the second object 3. Moreover, the restricting portion 125 and the seat 11 forms blocking for preventing the first fastening body 12 from being removed from the seat 11. When the second object 3 is to be disengaged, the first fastening body 12 is latitudinally moved toward one side, the first elastic element is simultaneously compressed such that the limiting portion 122 of the first fastening body 12 moves away the second object 3 and disengages the second object 3 from the abutting portion 112 of the seat 11. The first fastening body 12 is then released such that the first elastic element is elastically released to push and restore the first fastening body 12 for use of a next round (as shown in FIG. 13 and FIG. 14). Thus, coupling and disengagement of two objects can be completed, thereby achieving the effect of repeated and quick coupling and disengagement.

Figure 15:
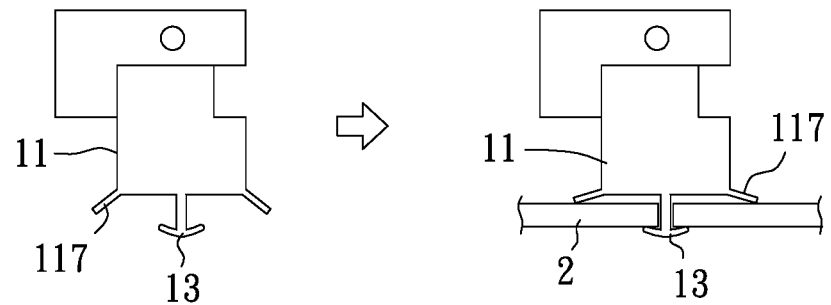
FIG. 15 is a schematic diagram of a state of use according to a third preferred embodiment of the present invention.

As shown in FIG. 15, in a preferred embodiment of the present invention, the second fastening body 13 is provided at the bottom of the seat 11, the seat 11 includes at least one elastic stopping portion 117, the second fastening body 13 is for assembling a first object 2, and the elastic stopping portion 117 is for elastically stopping the first object 2, so as to elastically fasten the first object 2 between the second fastening body 13 and the elastic stopping portion 117. In addition, the second fastening body 13 and the elastic stopping portion 117 can be in the same stopping direction (similarly disposed at 180 degrees at the seat 11). For assembly of the seat 11, the second fastening body 13 can be directly coupled with the first object 2 and the elastic stopping portion 117 elastically stops the first object 2, so as to elastically fasten the first object 2 between the second fastening body 13 and the elastic stopping portion 117.

Figure 16:
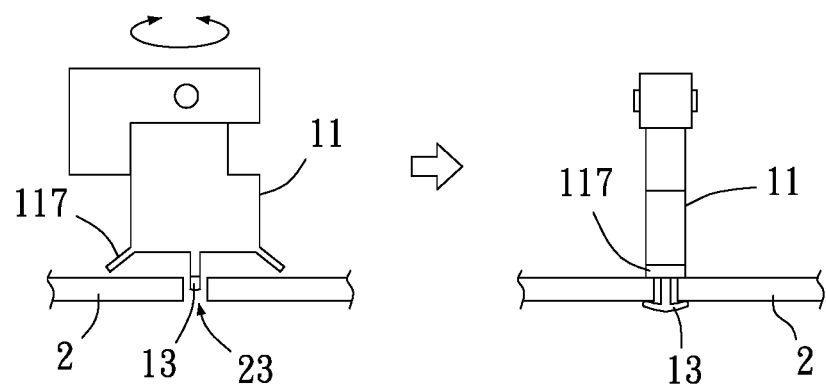
FIG. 16 is a schematic diagram of a state of use according to a fourth preferred embodiment of the present invention.

As shown in FIG. 16, in a preferred embodiment of the present invention, the second fastening body 13 and the elastic stopping portion 117 can be in different stopping directions (the second fastening body 13 is disposed at 90 degrees at the seat 11, and the elastic stopping portion 118 is disposed at 180 degrees at the seat 111). For assembly of the seat 11, the second fastening body 13 first passes through an assembled portion 23 of the first object 2, and the seat 11 is rotated by an angle of 5 degrees to 355 degrees so as to interfere or fasten with the first object 2, such that the first object 2 is elastically fastened between the second fastening body 13 and the elastic stopping portion 117.

Figure 17:
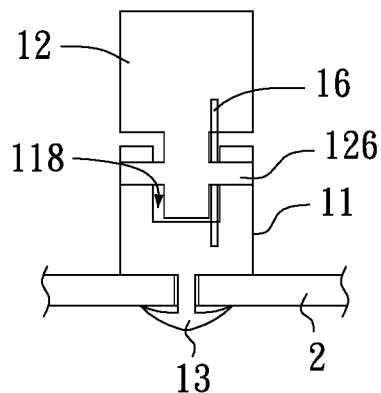
FIG. 17 is a first schematic diagram of a state of use according to a fifth preferred embodiment of the present invention.
Figure 18:
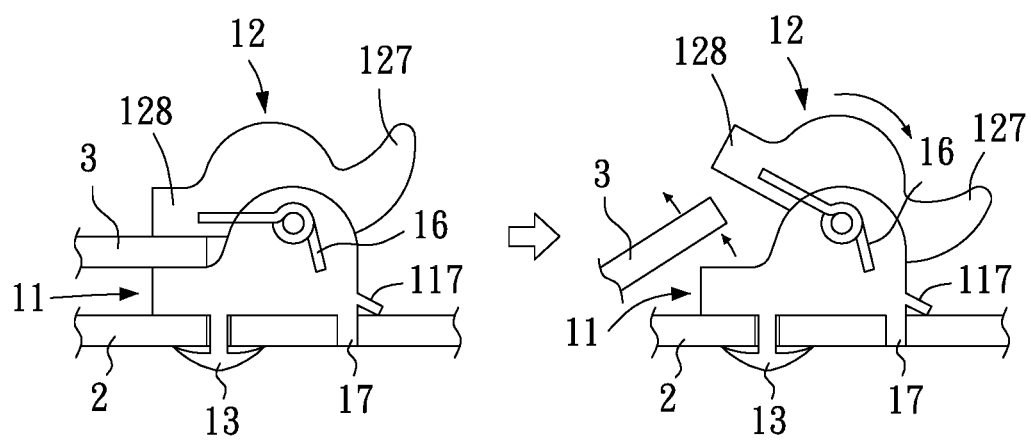
FIG. 18 is a second schematic diagram of a state of use according to the fifth preferred embodiment of the present invention.
Figure 19:
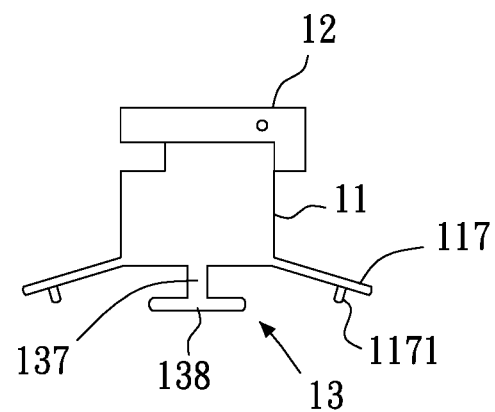
FIG. 19 is a schematic diagram according to a sixth preferred embodiment of the present invention.

As shown in FIG. 17 and FIG. 18, in a preferred embodiment of the present invention, the first fastening body 12 is rotatably provided at a slot 118 of the seat 11 by using a limiting portion 126, the limiting portion 126 is provided with an elastic element 16, and two ends of the elastic element 16 are respectively abutted against the seat 11 and the first fastening body 12. The bottom of the seat 11 is provided with a positioning portion 17, two ends of the first fastening portion 12 are respectively provided with an operating portion 127 and a fastening portion 128, and the positioning portion 17 is for positioning the first object 2, such that the seat 11 is at the same time positioned by the positioning portion 17 when it is assembled to the first object 2 by the second fastening body 13, and the seat 11 is limited by two latitudinal positioning structures including the second fastening body 13 and the positioning portion 17 so that the seat 11 is not rotated or turned.

Accordingly, once the seat 11 is provided at the first fastening body 12 by matching of the second fastening body 13, the elastic stopping portion 113 and a positioning portion 17, the operating portion 127 of the first fastening body 12 is pressed and the elastic element 16 is compressed such that the first fastening body 12 rotates at the seat 11, and the operating portion 127 is released once the second object 3 is placed at the position of the fastening portion 128 to elastically release the elastic element 16, further allowing the fastening portion 128 of the first fastening body 12 to be rotationally fastened at the second object 3. Thus, the present invention provides an effect of rotational fastening to meet requirements of actual use.

As shown in FIG. 19 to FIG. 24, in a preferred embodiment of the present invention, the second fastening body 13 includes an axial portion 137 and an obstructing portion 138. The axial portion 137 is located on the bottom surface of the seat 11, and the obstructing portion 138 is connected to the axial portion 137. An elastic stopping portion 117 is provided on each of two sides of the seat 11, and a fastening protrusion 1171 is provided at a bottom surface of each of the elastic stopping portions 117. The obstructing portion 138 and the elastic stopping portion 117 can be in different stopping directions (the obstructing portion 138 is provided at 90 degrees at the seat 11, and the elastic stopping portion 117 is provided at 180 degrees at the seat 11). The assembled portion 23 of the first object 2 is a wide hole, the wider portion of the axial portion 137 is smaller than the longer side of the obstructing portion 138 and smaller than the wide hole or the assembled portion 23 of the first object 2, and the fastening protrusion 1171 is for rotating from a non-longer side or a longer side of the wide hole to a longer side or a non-longer side of the wide hole to stop at a position inside or outside the wide hole so as to limit the position of the obstructing portion 138. To assemble the second fastening body 13, the obstructing portion 138 first passes through the assembled portion 23 of the first object 2, such that the longer side of the obstructing portion 138 is for passing through the first object 2 from the longer side of the wide hole (the axial portion 137 at this point is located in the assembled portion 23). The seat 11 is then rotated to rotate the longer side of the obstructing portion 138 to a position of the non-longer side of the wide hole to perform stopping. Meanwhile, the elastic stopping portion 117 is rotated from the non-longer side or the longer side of the wide hole to the longer side or the non-longer side of the wide hole to stop against the surface of the first object 2; the fastening protrusions 1171 are rotated from the non-longer side or the longer side of the wide hole to the longer side or the non-longer side of the wide hole to stop on the inside or outside the wide hole to restrict the position of the elastic stopping portion 117, thereby fitting with the assembled portion 23 of the first object 2 and be fastened, such that the first object 2 is fastened between the obstructing portion 138 and the elastic stopping portion 117, and the second fastening body 13 is rotationally fastened at the first object 2.

Figure 20:
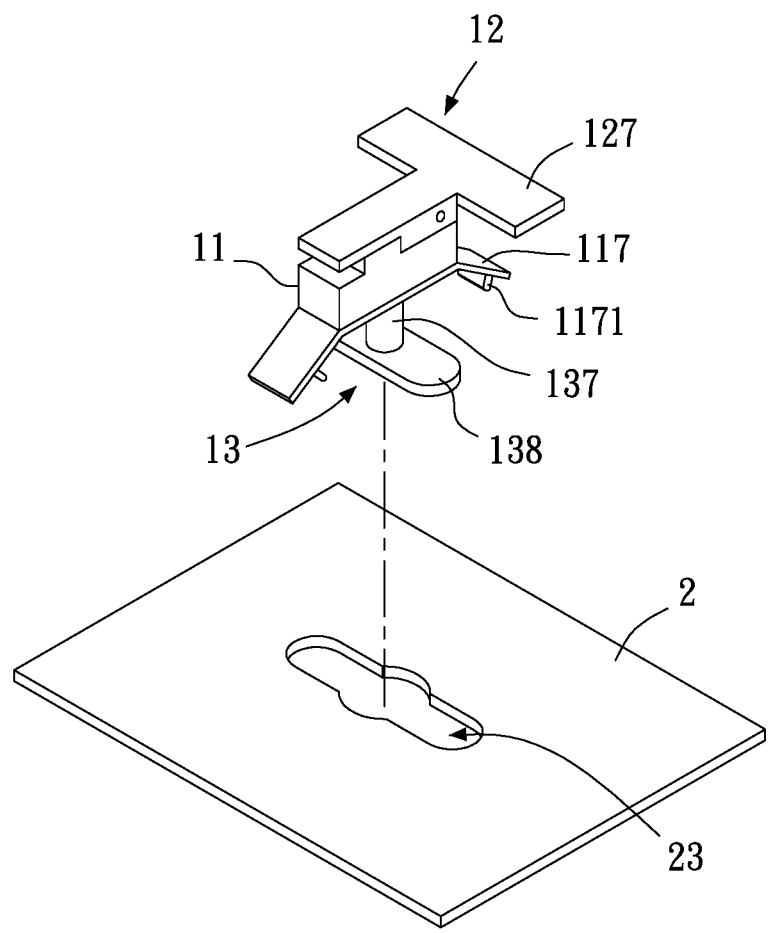
FIG. 20 is a first schematic diagram of a state of use according to the sixth preferred embodiment of the present invention.
Figure 21:
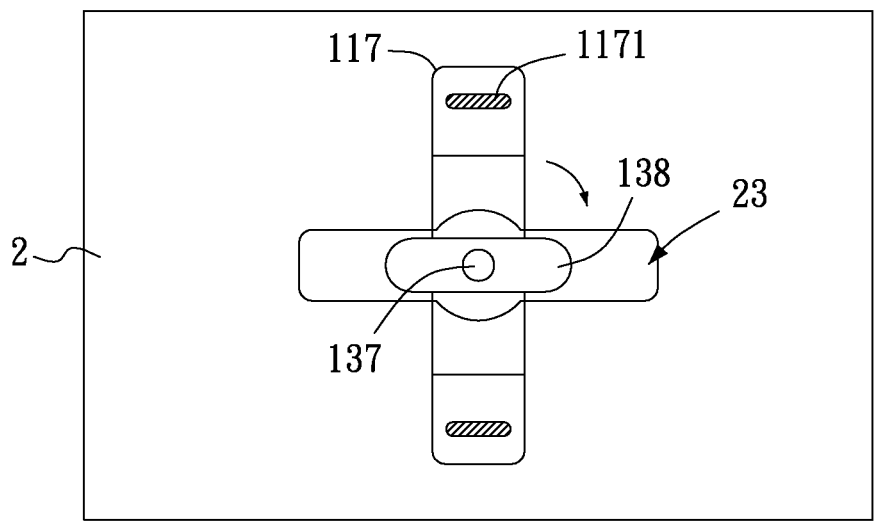
FIG. 21 is a second schematic diagram of a state of use according to the sixth preferred embodiment of the present invention.
Figure 22:
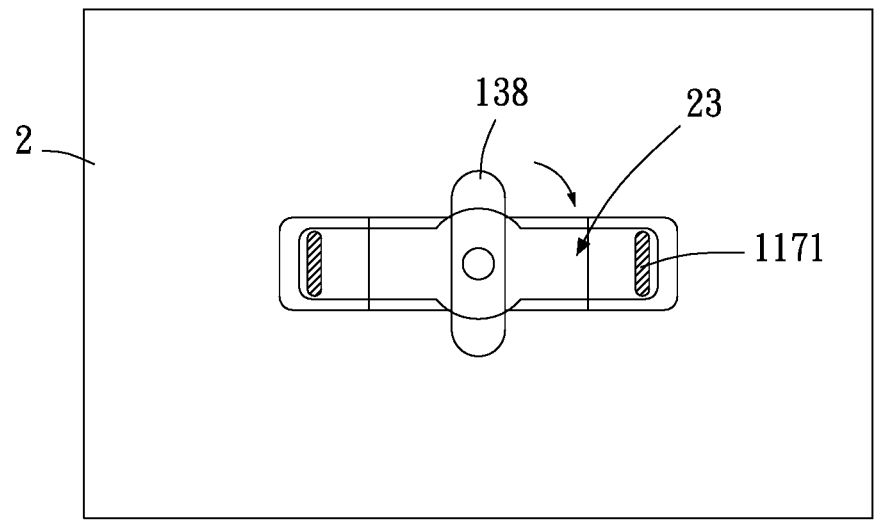
FIG. 22 is a third schematic diagram of a state of use according to the sixth preferred embodiment of the present invention.

The first fastening body 12 is an anti-slip structure appearing projecting, recessed or stepped in shape. Alternatively, the operating portion 127 of the first fastening body 12 can be an anti-slip structure appearing projecting, recessed or stepped in shape, or the operating portion can be a wing-like structure, a hooked structure, a column-like structure, an arc structure, a sloped structure, a stepped structure or a planar structure, so as to satisfy requirements of actual operation (as shown in FIG. 20).

Figure 23:
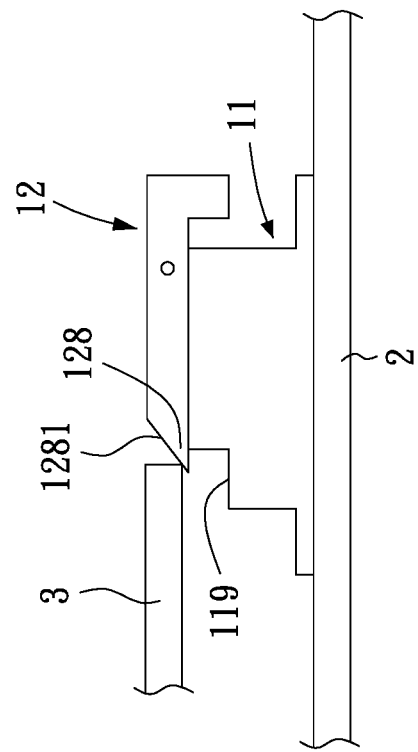
FIG. 23 is a first schematic diagram of a state of use according to a seventh preferred embodiment of the present invention.
Figure 24:
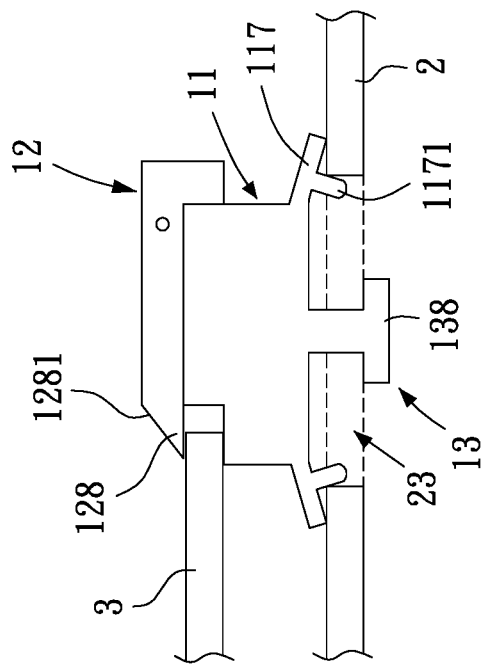
FIG. 24 is a second schematic diagram of a state of use according to the seventh preferred embodiment of the present invention.

Further, one end of the first fastening body 12 is provided with a fastening portion 128, one end of the fastening portion 128 is provided with a guiding portion 1281, and the guiding portion 1281 can be a sloped surface, an arc surface, a curved surface or a stepped surface. The first fastening body 12 can be pushed after the second object 3 is abutted against the guiding portion 1281, such that the first fastening body 12 receives a force and is drawn backward when the second object 3 applies a pressure on the guiding portion 2181. Once the second object 3 is moved to behind a shoulder 119 of the seat 11, the fastening portion 128 is fastened at the second object 3, so as to couple the second object 3 between the fastening portion 128 and the shoulder 119 (as shown in FIG. 23 and FIG. 24).

Figure 25:
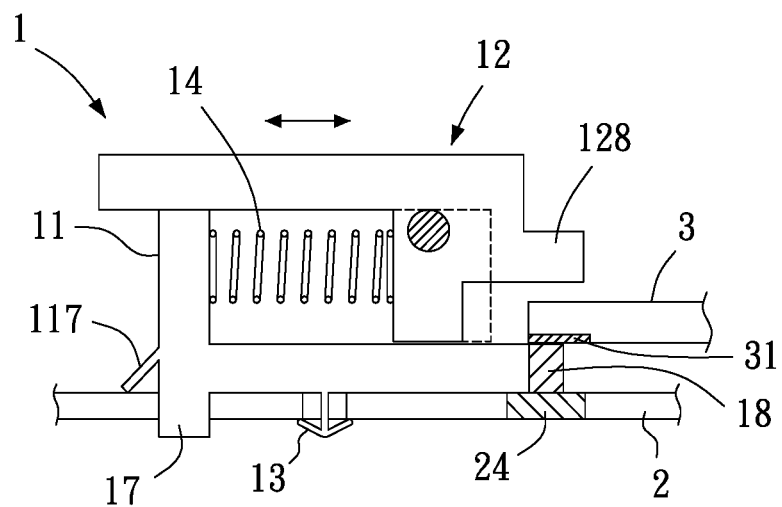
FIG. 25 is a second schematic diagram of a state of use according to an eighth preferred embodiment of the present invention.
Figure 26:
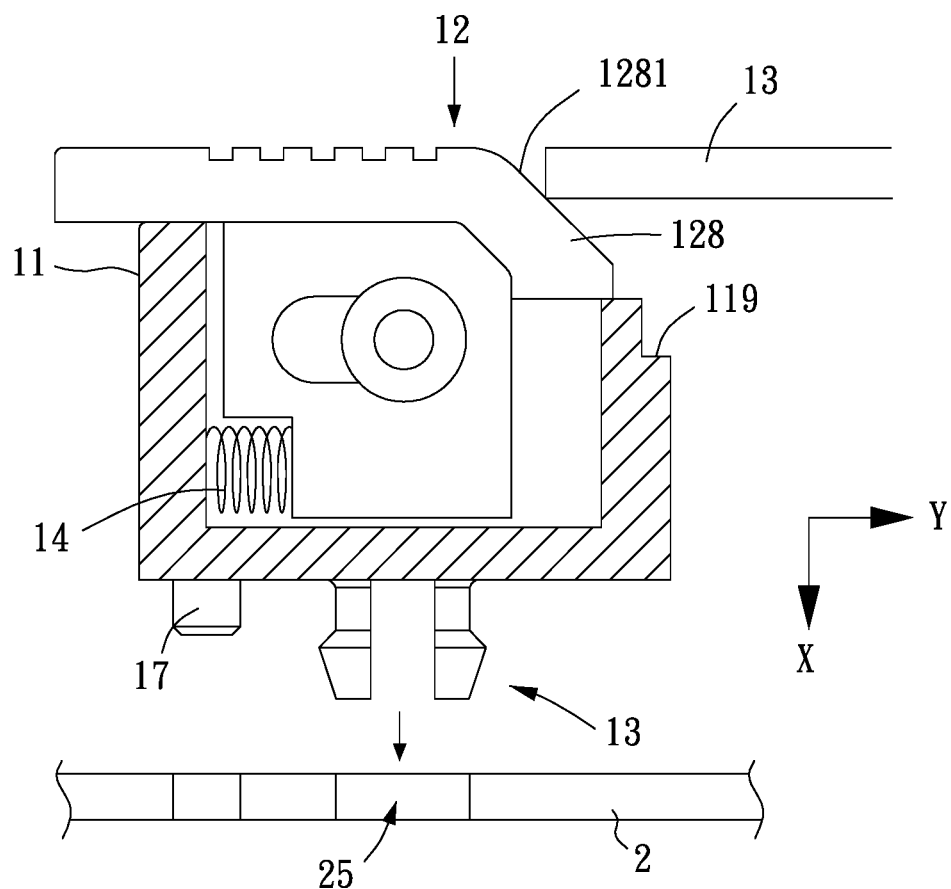
FIG. 26 is a second schematic diagram of a state of use according to a ninth preferred embodiment of the present invention.

As shown in FIG. 25, in a preferred embodiment of the present invention, the sliding positioning structure 1 is first assembled at the first object 2 and is then latitudinally fastened with or interferes with the second object 3. The first object 2 is a printed circuit board (PCB), a metal plate or a plastic plate, the second object 3 is a PCB, a metal plate or a plastic plate, and the first fastening body 2 can fit with or interfere with the second object 3. The sliding positioning structure 1 includes a conduction circuit portion 18, which is mutually connected to conduction circuit parts 24 and 31 of the first object 2 and the second object 3 and is for guiding static electricity or electric current.

Again as shown in FIG. 25, in a preferred embodiment of the present invention, the second fastening body 13 is a fastening structure provided in a first direction of the seat 11, and is for coupling a fastening hole 25 of the first object 2. The second fastening body 13 is greater than the fastening hole 25. The second fastening body 13 contracts after entering the fastening hole 25 and expand after passing through the fastening hole 25, and at the same time enables the positioning portion 17 to be positioned at the first object 2, such that the seat 11 is simultaneously positioned by the second fastening body 13 and the positioning portion 17, and the seat 11 is not rotated or turned. When the second object 3 is provided, the first fastening body 12 can be pushed once the second object 3 is abutted against the guiding portion 1281, such that the first fastening body 12 receives a force and is drawn backward when the second object 3 applies a pressure on the guiding portion 1281, so as to have the second object 3 enter between the first fastening body 12 and the seat 11. Once the second object 3 is moved to behind the shoulder 119 of the seat 11, the fastening portion 128 is fastened at the second object 3, so as to couple the second object 3 between the fastening portion 128 and the shoulder 119.

While the invention has been described by way of example and in terms of the preferred embodiments, it is to be understood that the embodiments are for illustrating the present invention and are not to be construed as limitations to the scope of the present invention. It should be noted that, any equivalent modifications and substitutions made to the embodiments are to be encompassed within the scope of the present invention. Therefore, the protection scope of the present invention is defined according to the appended claims.

What is claimed is:

1. A sliding positioning structure, comprising:
a seat, one end of the seat is provided with an abutting portion;
a first fastening body, latitudinally movably assembled at the seat, one end of the first fastening body is provided with a limiting portion, the limiting portion corresponds to the abutting portion, a second object is able to be fastened between the abutting portion and the limiting portion; and
a second fastening body comprises a body portion, a blocking portion and a fastening portion, wherein the body portion longitudinally penetrates the seat and the first fastening body, the blocking portion is blocked by the first fastening body, the fastening portion is fixedly coupled to the body portion and moves synchronously therewith, the body portion is longitudinally movably assembled at the first fastening body and the seat, and the second fastening body is configured to longitudinally fasten the seat at a first object with the fastening portion;
wherein one end of the seat is provided with a guiding portion, one end of the first fastening body is provided with a corresponding guiding portion, and the corresponding guiding portion is movably coupled with the guiding portion.

2. The sliding positioning structure according to claim 1, wherein the seat is laterally provided with a sliding portion, the first fastening body is laterally provided with a corresponding sliding portion, and the corresponding sliding portion is movably coupled with the sliding portion such that the first fastening body is movably assembled at the seat.

3. The sliding positioning structure according to claim 1, wherein the seat is provided with an assembling portion, one surface of the first fastening body is provided with a corresponding assembling portion, the corresponding assembling portion corresponds to the assembling portion, and the second fastening body passes through the corresponding assembling portion and the assembling portion.

4. The sliding positioning structure according to claim 3, wherein the first object comprises a pass area, and the fastening portion is for entering the pass area and then fitting with the first object.

5. The sliding positioning structure according to claim 3, wherein the first object comprises a pass area and a restricting area, the fastening portion is for entering the pass area and then entering the restricting area, and the second fastening body fits with the first object by using the fastening portion.

6. The sliding positioning structure according to claim 1, wherein a first elastic element is provided between the seat and the first fastening body, and two ends of the first elastic member are respectively abutted against the seat and the first fastening body.

7. The sliding positioning structure according to claim 1, wherein the fastening portion is provided on one end of the body portion and is located at a bottom of the seat, a second elastic element surrounds the body portion, and two ends of the second elastic element are respectively abutted against the seat and the second fastening body.

* * * * *